United States Patent [19]

Hayashi et al.

[11] Patent Number: 4,775,578

[45] Date of Patent: Oct. 4, 1988

[54] COLORED INK RIBBON OF ELECTROTHERMAL TRANSFER TYPE FOR THERMAL PRINTERS

[75] Inventors: Osami Hayashi; Akio Nakamura; Yasuhiro Goto, all of Saitama, Japan

[73] Assignee: Shin-Etsu Polymer Co., Ltd., Tokyo, Japan

[21] Appl. No.: 81,288

[22] Filed: Aug. 3, 1987

[30] Foreign Application Priority Data

Aug. 11, 1986 [JP] Japan ............................... 61-188073

[51] Int. Cl.[4] ............................................... B32B 7/02

[52] U.S. Cl. .................................... 428/216; 400/120; 428/195; 428/209; 428/484; 428/913; 428/914

[58] Field of Search ............... 428/195, 207, 209, 484, 428/488.1, 488.4, 913, 914, 216, 335, 336; 400/120

[56] References Cited

FOREIGN PATENT DOCUMENTS 2099602 12/1982 United Kingdom ................ 428/914

*Primary Examiner*—John E. Kittle
*Assistant Examiner*—P. R. Schwartz
*Attorney, Agent, or Firm*—Wyatt, Gerber, Burke and Badie

[57] ABSTRACT

The invention provides an electrothermal hot-melt type thermal transfer ink ribbon having a multi-layered structure used in thermal printers having a multi-stylus electrode head. Different from conventional ink ribbons of such a type composed of an electroconductive base film as a resistive layer, a vapor-deposited aluminum layer to serve as an electric pass to a return electrode and a layer of a hot-melt ink, the inventive ink ribbon has an additional layer as a heat barrier between the aluminum layer and the hot-melt ink layer so that the heat generated in the resistive base film and reaching the ink layer is radially diffused to produce a remarkable temperature gradient within the dot decreasing from the center to the periphery thus to provide a possibility of gradation control of the optical density of the printed dots by means of the voltage adjustment.

5 Claims, 2 Drawing Sheets

COLORED INK RIBBON OF ELECTROTHERMAL TRANSFER TYPE FOR THERMAL PRINTERS

BACKGROUND OF THE INVENTION

The present invention relates to a colored ink ribbon of the electrothermal transfer type for thermal printers. More particularly, the invention relates to a colored ink ribbon of the electrothermal transfer type having excellent gradation recordability to give a continuous change in the optical density of the printed dots, from which a dotted pattern of a hot-melt ink is transferred to recording paper under contact of multi-stylus electrodes from which electric currents are supplied in accordance with the information signals toward a return electrode to evolve Joule's heat and to melt the hot-melt ink to be ready for transfer.

In the recently developed color printers used, for example, in digital color copying machines, video printers, computer graphics and the like, a fully colored image is obtained by the so-called subtractive mixture printing in which superposed printing is performed using transparent colored inks of the three primary colors, i.e. yellow, magenta and cyan, so as to produce seven recording colors of yellow, magenta, cyan, red, blue, green and black according to the method of subtractive mixture by performing changing of the intensity of the picture elements of the three primary colors in 16 steps, 32 steps, 64 steps, and so on. When the gradation of the picture elements of the three primary colors is in 64 steps, for example, the colored images as printed may include $64^3$ or about 260,000 different colors.

The color printing by the above mentioned principle can be performed in two different ways including the thermal transfer printing system and the ink-jet printing system. Intensive investigations are now under way to develop practical systems in these two ways. The ink-jet printing sytem has several problems and disadvantages due to the principle of the system in which inks of three different colors are ejected at the surface of the recording paper from three jet nozzles. Namely, the ink-jet printing system cannot give an excellent gradation recordability and the reproducibility of the printed pattern is poor relative to the accuracy of the position. Furthermore, the velocity of printing cannot be high enough taking, for example, 3 minutes or more for printing a full page of an A4 sheet using a line printer.

The thermal transfer printing system can be further classified into two different types including the hot-melt thermal transfer printing system and the sublimate type thermal transfer printing system. The former system utilizes a colored ink ribbon formed of a film such as a polyester film coated with a layer of a hot-melt ink in which a colored pigment is dispersed. The hot-melt ink is melted under heating with a thermal head on the film and directly transferred to the recording paper. In the latter system, a layer of a coloring material containing a sublimable dye and applied to the surface of a film, such as a polyester film, is brought into contact with a sheet of polypropylene-based synthetic paper provided with a developing layer containing a color developer under heating with a thermal head on the film so that the dye sublimed from the layer of the coloring material reaches the developing layer and is developed there to exhibit the color. Although this sublimate type thermal transfer printing system is excellent in the gradation recordability by means of the intensity control of the picture elements and area-controlled gradation can readily be obtained by controlling the diameters of dots so that the system is easily applicable to color printers. But this system is disadvantageous due to the use of special recording paper which is not susceptible to writing with a ball-point pen and the like and the printed color pattern thereon is subject to fading with the lapse of time to greatly decrease the versatility of the system for business use in general. Therefore, the major current of the thermal transfer printing system is toward the hot-melt type.

The hot-melt type thermal transfer printing system has also several problems such as the poor gradation recordability and low printing velocity taking, for example, 60 seconds or more for three-color mixed printing on an A4 sheet using a line printer because of the necessarily slow cycle of the electric power supply for heating up the thermal head in respect of the drawback caused by increasing the number of cycles of the electric power supply that the thermal head is heated up by the accumulation of heat to cause transfer of the ink on extraneous areas resulting in blurred printing. A proposal has been made to solve these problems in the hot-melt type thermal transfer printing system in which melting of the hot-melt ink is effected by local heating with an electric current. Namely, the colored ink ribbon is prepared by coating a film first with a layer of an electrically conductive material having a suitable volume resistivity and then with a layer of a hot-melt ink. The ink ribbon is brought into contact with a return electrode having a broad contacting area, for example by being pressed under multi-stylus electrodes which apply a pulse-wise voltage to the ribbon in accordance with the information signals so that Joule's heat is evolved in the resistance layer in the vicinity of the signaled electrode styluses and the hot-melt ink is melted by this strongly localized heating and transferred to the recording paper. In this system, the heat to melt the hot-melt ink is evolved in the ribbon per se and not in the stylus electrodes so that the frequency of pulse-wise voltage application can be greatly increased to about 3000 pulses/second or even larger from the frequency of about 500 pulses/second in the prior art for heating up the thermal head. This increase in the pulse frequency greatly contributes to the improvement of the printing velocity using a line printer to decrease the time taken for printing on a full page of an A4 sheet, for example, to 10 seconds or less.

The printing ribbon for the electrothermal transfer printing system has a three-layer structure composed of a film of an electro-conductive plastic resin imparted with a volume resistivity of about 1 ohm-cm by compounding with a carbon black filler, a vapor-deposited aluminum layer thereon having a thickness of about 0.1 μm and a top-coat layer of a hot-melt type solid ink for transfer. Namely, the layer of the hot-melt ink is in direct contact with the thin aluminum layer. Therefore, melting of the hot-melt ink cannot take place unless the electric energy converted into heat in the resistance layer exceeds a certain lower limit so that no printing by the transfer of molten ink can be obtained. When the electric energy converted into heat in the resistance layer exceeds the lower limit, the hot-melt ink can of course be melted and transferred to the recording paper but the optical density of the printed dots cannot be increased even by further increasing the electric energy. Therefore, gradation of the picture elements in the printed pattern must be controlled by the binary-area gradation method in which coverage of the printed area is controlled by means of the arrangement of the printed dots. This way of gradation control requires increase in the density of the styluses of the multi-stylus electrode head and an additional electric circuit for the control of the dot matrix in order to obtain a picture image of high resolution and high quality, leading to a disadvantage of increased costs and difficulty in the manufacture of such multi-stylus electrodes in addition to the problem of increased difficulty for designing a compact printing system.

SUMMARY OF THE INVENTION

An object of the present invention is therefore to provide an improved color printing system freed from the above described problems and disadvantages in the conventional printing systems.

Another object of the invention is to provide an improved electrically heated, hot-melt type thermal transfer colored ink ribbon.

The electrically heated, hot-melt type thermal transfer colored ink ribbon provided by the invention is composed of the successive layers comprising:

(a) a base film as an electric resistance layer;
(b) a vapor-deposited thin layer of aluminum formed on the base film to serve as an electric pass to a return electrode;
(c) a heat barrier layer formed on the vapor-deposited aluminum layer; and
(d) a layer of a hot-melt type thermal transfer ink formed on the heat barrier layer.

DETAILED DESCRIPTION OF THE PREFERRED EMBODIMENTS

As is understood from the above given summary of the invention, the hot-melt type thermal transfer ink ribbon of the invention is composed of successive layers comprising a resistive-base film, a vapor-deposited aluminum layer, a heat barrier layer and a layer of a hot-melt ink, of which the most characteristic of the invention is the third layer, i.e. the heat barrier layer, provided between the electroconductive aluminum layer and the hot-melt ink layer.

Namely, the present invention relates to an improvement of an electrothermally heated, hot-melt type transfer ink ribbon composed of a resistive base film, vapor-deposited aluminum layer and hot-melt ink layer. Such a ink ribbon is used by mounting on a printer having a multi-stylus electrode head which is pressed against the base film on a rubber-made platen roller with a sheet of recording paper therebetween to apply an electric voltage between several styluses of the multi-stylus electrodes selected in accordance with the information signals and the return elec-trode so that the electric energy is converted into heat in the re-sistive base film to cause melting and transfer of the hot-melt ink at the spots corresponding to the voltage-applied stylus electrodes.

An advantage is unexpectedly obtained by providing a heat barrier layer between the aluminum layer and the hot-melt ink layer in such an electrothermally heated, hot-melt type transfer ink ribbon that the gradation in the optical density of the picture image can be continuously varied when the hot-melt ink is melted and transferred to the recording paper according to the voltage of the pulses and the duration of the voltage application to the multistylus electrodes. Accordingly, the investigations of the inventors have been directed to the material, thickness and other factors of the heat barrier layer leading to the establishment of the present invention.

In the following, the electrothermally heated, hot-melt type transfer ink ribbon of the invention and the advantageous perform-nce thereof are described in detail with reference to the accompanying drawing.

Figure 1:
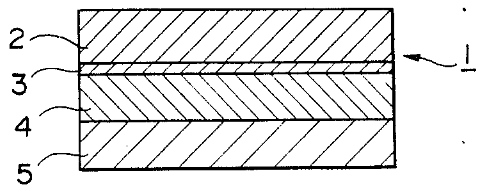
FIG. 1 is a schematic cross sectional view of the inventive ink ribbon showing the four-layered structure.

FIG. 1 illustrates a cross section of the inventive ink ribbon 1 as cut perpendicularly to the surface of the ribbon showing the four-layered structure. The resistive base film 2 having a thickness of 5 to 30 $\mu m$ is made of an electroconductive plastic resin having a volume resistivity of 0.5 to 10 ohm-cm. On one surface of the resistive base film 2, a thin layer of aluminum 3 is formed, for example, by vacuum vapor-phase deposition. The vapor-deposited aluminum layer 3 should have a thickness of 0.02 to 0.2 $\mu m$ corresponding to a surface resistivity of 0.5 to 5 ohm. The vapor-deposited aluminum layer 3 is overlaid with a heat barrier layer 4 having a thickness of 1.5 to 15 $\mu m$ formed of a material having a coefficient of thermal conductivity in the range from $10^{-5}$ to $10^{-3}$ cal/sec.°C.cm. Such a heat barrier layer 4 can be formed by applying and adhesively bonding a plastic resin film or by coating with a coating composition containing a resin as the vehicle. Polymeric materials suitable for the heat barrier layer 4 include polyesters, polyamides, polycarbonates, polyimides, cellulosic polymers, epoxy resins, fluoroplastics, phenolic resins, polyacetals, poly(meth)acrylates, polyphenylene oxides and the like though not particularly limited thereto. Finally, a top-coat layer 5 is formed by coating with a hot-melt type transfer ink in a thickness in the range from 2 to 8 $\mu m$. The hot-melt ink should have a melting point $T_M$ in the range from 60° to 160° C.

Figure 2:
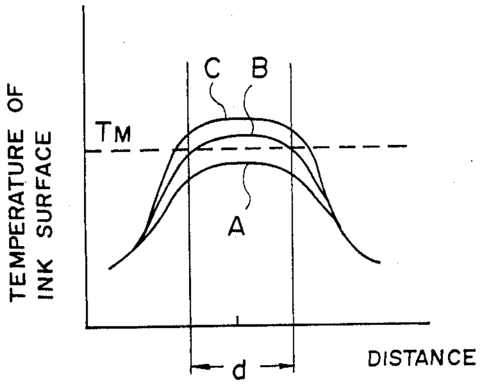
FIGS. 2 and 3 are each a graph showing of the temperature distribution profile on the surface of the hot-melt ink layer heated by a single stylus electrode along the radial cross section of a dot in a conventional and the inventive hot-melt type thermal transfer ink ribbons, respectively, under different values of applied voltage.

FIG. 2 is a graph schematically showing the temperature distribution along a radial cross section of a dot-wise area on the inked surface of a conventional electrothermally heated hot-melt type transfer ink ribbon having no heat barrier layer under electrothermal heating with a stylus electrode. The curves A, B and C correspond to different vlues of voltage between the stylus electrode having a diameter of d and the return electrode in an increasing order of $A<B<C$, the pulse width being the same. As is understood from the graph, the profiles of the curves are relatively flat with a small temperature difference between the points just under the center and along the periphery of the area corresponding to the end surface of the stylus electrode because the heat generated in the resistive layer is directly transmitted to the layer of the hot-melt ink due to the absence of the heat barrier layer as in the inventive ink ribbon. This means that no melting and hence no transfer of the hot-melt ink take place at all when the applied voltage is low as in the curve A by which even the temperature at the center of the stylus electrode cannot exceed the melting point $T_M$ of the hot-melt ink. When the applied voltage is somewhat increased so that the temperature of the hot-melt ink layer at the center of the stylus electrode may slightly exceed the melting point $T_M$ of the ink, melting and transfer of the hot-melt ink of course can take place as in the curve B but the area at which the temperature of the ink exceeds $T_M$ spreads almost to the whole end surface of the stylus electrode in such a manner that further increase of the applied voltage can hardly increase the area of the molten and transferred ink as in the curve C. Namely, the size of the printed ink dot formed by the transfer of the molten ink in this conventional electrothermally heated hot-melt type transfer ink ribbon can hardly be controlled by the adjustment of the applied voltage.

Figure 3:
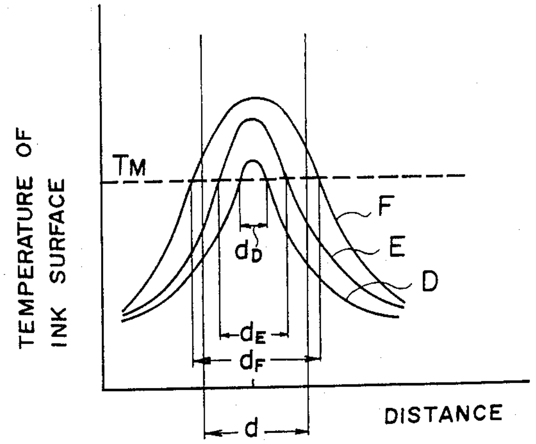

In contrast thereto, FIG. 3 is a graph showing similar to FIG. 2, in which three curves D, E and F are given for three different values of the applied voltage on the stylus electrode each curve showing the temperature distribution on the inked surface of the inventive hot-melt type transfer ink ribbon having a heat barrier layer 4. The applied voltages corresponding to the curves of D, E and F are in the increasing order of $D<E<F$, the pulse width being the same. When heat is generated in the resistive layer 2 by the application of a voltage on the stylus electrode having a diameter of d, the heat is transmitted toward the hot-melt ink layer 5 through the aluminum layer 3 and heat barrier layer 4 while a considerable portion of the heat is diffused within the heat barrier layer 4 in the radial direction so that the temperature of the ink layer 5 is high at the center and low along the periphery of the area corresponding to the end surface of the stylus electrode to give a relatively sharp peak-wise profile of the distribution curve shown in FIG. 3. When the applied voltage is relatively low as in the curve D, therefore, the temperature of the ink layer 5 exceeds the melting point $T_M$ of the ink only in the very center portion of the area corresponding to the end surface of the stylus electrode. When the applied voltage is increased as in the curves E and F, the area at which the temperature of the ink layer 5 exceeds $T_M$ is increased so much as to be controlled by the adjustment of the applied voltage. Namely, the diameters of the printed ink dots $d_D$, $d_E$ and $d_F$ are in the increasing order of $d_D<d_E<d_F$ corresponding to the increase of the applied voltage. This means that the diameter of the printed ink dot can be well controlled by the adjustment of the applied voltage so that good gradation recordability can be obtained by the control of the area of the printed ink dots.

Figure 4A:
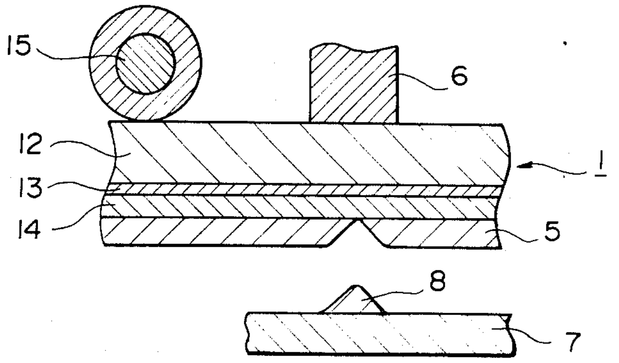
FIGS. 4*a* and 4*b* are each a schematic cross-sectional illustration of the inventive ink ribbon after dot-wise transfer of the hot-melt ink on to the recording paper under pressing and heating by a stylus electrode corresponding to the values of the applied voltages D and F, respectively, in FIG. 3.

The above described advantage in the inventive ink ribbon is further illustrated with reference to FIGS. 4*a* and 4*b* each showing a schematic cross sectional view of the inventive ink ribbon 1, a stylus electrode 6 pressed against the ribbon 1 and a sheet of recording paper 7 below the ink ribbon 1. FIG. 4*a* corresponds to the curve D in FIG. 3 with a relatively low voltage applied between the stylus electrode 6 and the return electrode 15 which is in contact with the resistive layer 12. When the ink ribbon 1 is pressed against the recording paper 7 so as to have the layer of the hot-melt ink 5 contacted with the paper 7 and a pulsewise voltage is given to the stylus electrode 6, the hot-melt ink 5 is molten and transferred to the paper 7 to form a printed dot 8 on the paper 7. Due to the low value of the applied voltage, however, the ink layer 5 is melted only in the area corresponding to the very center area of the end surface of the stylus electrode 6 so that the printed ink dot 8 on the paper 7 also has a very small diameter.

Figure 4B:
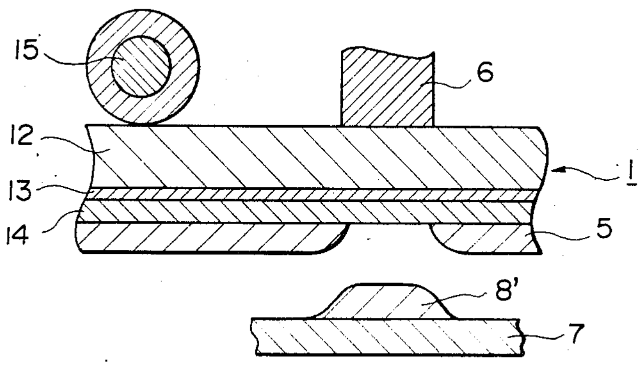

FIG. 4*b* corresponds, for example, to the curve F in FIG. 3 with a relatively large value of the applied voltage. Due to the increase in the applied voltage, the ink layer 5 is melted over a much wider area than in FIG. 4*a*. Namely, the area of the molten ink in the ink layer 5 is almost as wide as that of the end surface of the stylus electrode 6 so that the printed ink dot 8' transferred from the ink layer 5 also has an increased diameter. Such a large ink dot 8' on the paper 7 is also advantageous in re-spect of the adhesion to the surface of the recording paper 7.

Following is an example to illustrate the electrothermal transfer type ink ribbon of the present invention in more detail.

EXAMPLE

An electroconductive polycarbonate film having a thickness of 15 μm and a volume resistivity of 0.9 ohm-cm (Makrofol KL3- 1009, a product of Bayer Co., West Germany) was provided on one surface successively with a vapor-deposited layer of aluminum having a thickness of 0.06 μm and a surface resistivity of 1.2 ohm, a heat barrier layer formed of a hot-melt type copolymeric saturated polyester resin (Vitel PE 200, a product of Goodyear Tire and Rubber, Inc., United States) having a coefficient of thermal conductivity of $3\times10^{-4}$ cal/sec.°C.cm and finished on an offset gravure coater to have a thickness of 6 μm, an intermediate ink layer of a hot-melt type ink (NT-R-K, a product of Shin-Etsu Polymer Co., Japan) having a thickness of 2 μm by roll coating and finally a top-coat layer of a colored ink (32BK-102 Yellow, a product of Teikoku Ink Manufacturing Co., Japan) in a thickness of 4 μm to give an ink ribbon.

Figure 5:
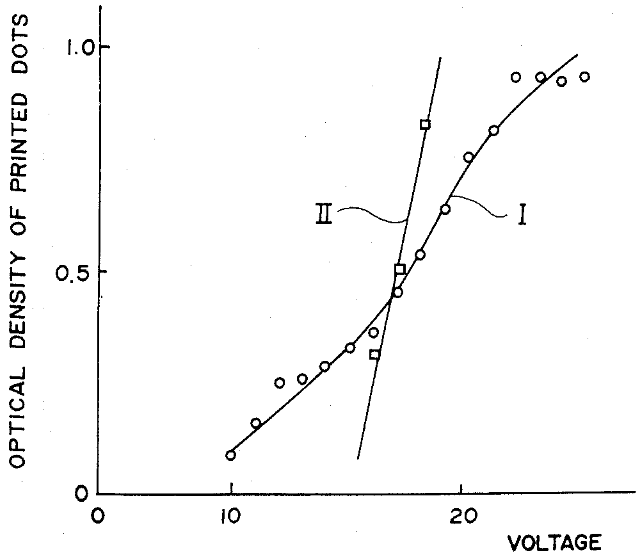
FIG. 5 is a graph showing the optical density of the printed dots as a function of the voltage applied between the stylus electrode and the return electrode in the inventive (curve I) and conventional (curve II) ink ribbons.

The thus prepared ink ribbon was mounted on an electrothermal hot-melt type transfer printer and was contacted with a stylus electrode having a diameter of 50 μm. Printing tests were undertaken on a sheet of plain paper by applying a pulse-wise voltage having a pulse width of 0.5 millisecond to the stylus electrode at a frequency of 1000 pulses/second with varied values of the voltage. The printed dots were subjected to the measurement of the optical density and the results are shown in an arbitrary unit in FIG. 5 by the curve I as a function of the applied voltage. As is understood from this curve I, the optical density of the printed dots gradually increased with the increase in the applied voltage over a considerably wide range of the voltage changed to give a possibility of controlling the optical density of the printed dots and consequently obtaining good gradation recordability by the adjustment of the applied voltage.

Each of the thus printed ink dots was subjected to the measurement of the % transmission of infrared ray beams projected to the center spot of the dot by using a colorimetric system to find that the intensity of the transmitted infrared ray was decreased linearly with the increase in the applied voltage.

For comparison, the same experiment as above was repeated except that the ink ribbon mounted on the printer had no heat barrier layer between the vapor-deposited aluminum layer and the hot-melt ink layer. The results are shown by the curve II in FIG. 5. As is clear from this figure, the gradient of the curve II was very large in comparison with the curve I indicating that control of the optical density of the printed dots could hardly be performed by the adjustment of the applied voltage consequently to give no good gradation recordability.

What is claimed is:

1. A multi-layered electrothermal hot-melt type transfer ink ribbon which comprises the successive layers of:

(a) a base film made of an electroconductive plastic resin as an electric resistance layer;

(b) a vapor-deposited layer of aluminum formed on the base film to serve as an electric pass to a return electrode;

(c) a heat barrier layer made of a synthetic resin and formed on the vapor-deposited aluminum layer, said heat barrier layer having a coefficient of thermal conductivity from $10^{-5}$ to $10^{-3}$ cal/sec.°C. cm and a thickness from 1.5 to 15 μm; and (d) a layer of a hot-melt type thermal transfer ink formed on the heat barrier layer.

2. The multi-layered electrothermal hot-melt type transfer ink ribbon as claimed in claim 1 wherein the base film has a volume resistivity in the range from 0.5 to 10 ohm-cm and a thickness in the range from 5 to 30 μm.

3. The multi-layered electrothermal hot-melt type transfer ink ribbon as claimed in claim 1 wherein the vapor-deposited aluminum layer has a thickness in the range from 0.02 to 0.2 μm and a surface resistivity in the range from 0.5 to 5 ohm.

4. The multi-layered electrothermal hot-melt type transfer ink ribbon as claimed in claim 1 wherein the hot-melt type thermal transfer ink has a melting point in the range from 60° to 160° C.

5. The multi-layered electrothermal hot-melt type transfer ink ribbon as claimed in claim 1 wherein the layer of a hot-melt type thermal transfer ink has a thickness in the range from 2 to 8 μm.

* * * * *